United States Patent [19]
Masak et al.

[11] B 3,987,444
[45] Oct. 19, 1976

[54] INTERFERENCE REJECTION SYSTEM FOR MULTI-BEAM ANTENNA HAVING SINGLE CONTROL LOOP

[75] Inventors: Raymond J. Masak, East Northport; James J. Maune, Plainview, both of N.Y.

[73] Assignee: Hazeltine Corporation, Greenlawn, N.Y.

[22] Filed: Aug. 12, 1974

[21] Appl. No.: 496,502

[44] Published under the second Trial Voluntary Protest Program on January 20, 1976 as document No. B 496,502.

[52] U.S. Cl. ............... 343/100 LE; 343/100 CL; 325/371
[51] Int. Cl.² ............................................. H04B 7/00
[58] Field of Search .............. 343/100 LE, 100 CL; 325/371; 340/15.5 CC, 15.5 SC

[56] References Cited
UNITED STATES PATENTS 3,177,489   4/1965   Saltzberg .................... 343/100 LE
3,763,490   10/1973  Hadley et al. ................ 343/100 SA

*Primary Examiner*—T.H. Tubbesing
*Assistant Examiner*—T. M. Blum

[57] ABSTRACT

Disclosed is a system for receiving a signal from a known direction and rejecting interfering signals arriving from other directions. The system makes use of an antenna unit having multiple output ports, each responsive to signals from a different selected region of space. The output port correspondong to the region of space, which includes the direction of the desired signal, is coupled directly to an output combiner while the antenna ports corresponding to the remaining regions of space are combined to form a reference signal. Means are provided to form a correction signal in response to the reference signal and output signal for suppressing interfering signals arriving from other than the selected region of space.

5 Claims, 2 Drawing Figures

INTERFERENCE REJECTION SYSTEM FOR MULTI-BEAM ANTENNA HAVING SINGLE CONTROL LOOP

BACKGROUND OF THE INVENTION

The invention herein described was made in the course of or under a contract with the Department of the Navy.

This invention relates to systems for receiving wave energy signals and particularly to systems which adaptively suppress interference in the received signal.

Prior art adaptive canceling systems have most often been used in connection with radar systems. A radar system usually uses a highly directional antenna which has a main beam and many sidelobes. A signal within the received frequency band of the radar may cause radar jamming by having sufficient amplitude to saturate the radar receiver when that signal is incident on the antenna sidelobes as well as the main beam. Prior art systems have been developed for cancelling this type of interference in a radar system. These prior art systems usually use an omni-directional auxiliary antenna to receive the interfering signal in an auxiliary channel. The interfering signal in the auxiliary channel is combined with the signal received in the main radar channel to adaptively cancel the interfering signal when the interfering signal is present on the radar sidelobes.

This system limits the adverse effects of the interfering signal to only those portions of the radar scanning time when the main beam is pointed at the interfering signal source. This facilitates location of the interfering signal source and prevents that source from interfering with the radar detection of other targets.

The prior art radar adaptive sidelobe canceller usually discriminates between an interfering signal and a desired radar return signal on the basis of signal format. For example, a radar usually transmits short pulses of R.F. energy to facilitate range finding. An interfering signal to be effective is most often a more continuous signal and therefore the adaptive canceling circuit may be designed to respond only to signals having a duration substantially greater than the duration of the desired radar pulse. In other cases the radar signal may be a phase coded or frequency chirped signal which may be distinguished from the undesired interfering signal according to the known characteristics of the desired radar signal.

While useful in systems wherein the signal format of the desired signal is easily distinguished from the signal format of the interfering signal, such as radar systems and communications systems using predetermined codes, the above described prior art adaptive sidelobe canceling systems are not usable in systems where there is no distinguishing feature between the desired signal and the interfering signal. For example, in a system where the desired signal is an amplitude modulated signal and the interfering signal is also an amplitude modulated signal in the same frequency band, discrimination on the basis of signal format is not possible. In some of these systems it is possible to distinguish between a desired signal and an interfering signal on the basis of a priori knowledge of the location of the source of the desired signal. Very often sufficient discrimination between the desired signal and the interfering signal may be accomplished using only a directional antenna. In some instances, however, the interfering signal may be of such a greater intensity than the desired signal that the interfering signal received on an antenna sidelobe has greater signal strength in the receiver than the desired signal received on the antenna main beam. This is possible, for example, in an instance where a shore based communications terminal which is seeking to receive a desired signal from ships far at sea is located in the vicinity of another transmitting terminal and receives interference from that transmitting terminal.

R. J. Masak in his co-pending application, Ser. No. 496,494 filed Aug. 12, 1974, entitled, "Interference Rejection System For Multi-Beam Antenna" which is assigned to the same assignee as the present application, has described a system for suppressing interference on the basis of direction of signal origin. That system utilizes a multiple beam antenna, having multiple output ports and provides for adaptive circuitry responsive to the output of each antenna port except the port corresponding to the direction of the desired signal.

OBJECTS OF THE INVENTION

It is therefore an object of the present invention to provide a system for receiving desired wave energy signals and suppressing interfering signals.

It is a further object of the present invention to provide such a system wherein discrimination between the desired signal and the interfering signal is on the basis of direction of arrival of the respective signals.

It is a still further object of the present invention to provide such a system using an antenna which is responsive to signals originating in multiple regions of space and has multiple output ports each primarily responsive to signals originating in one of the regions of space.

It is a still further object of the present invention to provide such a system using only a single circuit responsive to the combined outputs of the antenna ports.

SUMMARY OF THE INVENTION

In accordance with the present invention there is provided a system for receiving desired wave energy signals from a selected angular region of space within the area covered by the system and for suppressing interfering signals from all other angular regions within the coverage area. The system includes antenna means, having a first plurality of antenna elements and a second plurality of output ports for receiving wave energy signals from said coverage area and for developing at each of said output ports a signal primarily representative of the wave energy signals received from a corresponding predetermined angular region of said coverage area. The system further includes first means for combining supplied signals in accordance with a predetermined function to develop an output signal. It includes second means for combining supplied signals in accordance with a predetermined function to develop a reference signal. It also includes means for coupling signals, including desired and interfering signal components, from a selected output port of said antenna means to an input of said first combining means and for coupling a portion of the signals from at least the remainder of said antenna ports to inputs of said second combining means. Also included are means for developing a correction signal. It includes means for mixing the output signal from said first combining means and the reference signal from said second combining means thereby to develop a control signal. Further included are means for mixing said control signal and said reference signal thereby to develop a correction signal. Finally, there is included means for coupling said correction signal to an input of said first combining means thereby causing suppression of said interfering signal components in said output signal.

For a better understanding of the present invention together with other and further objects thereof reference is had to the following description taken in conjunction with the accompanying drawings and its scope will be pointed out in the appended claims.

Figure 1:
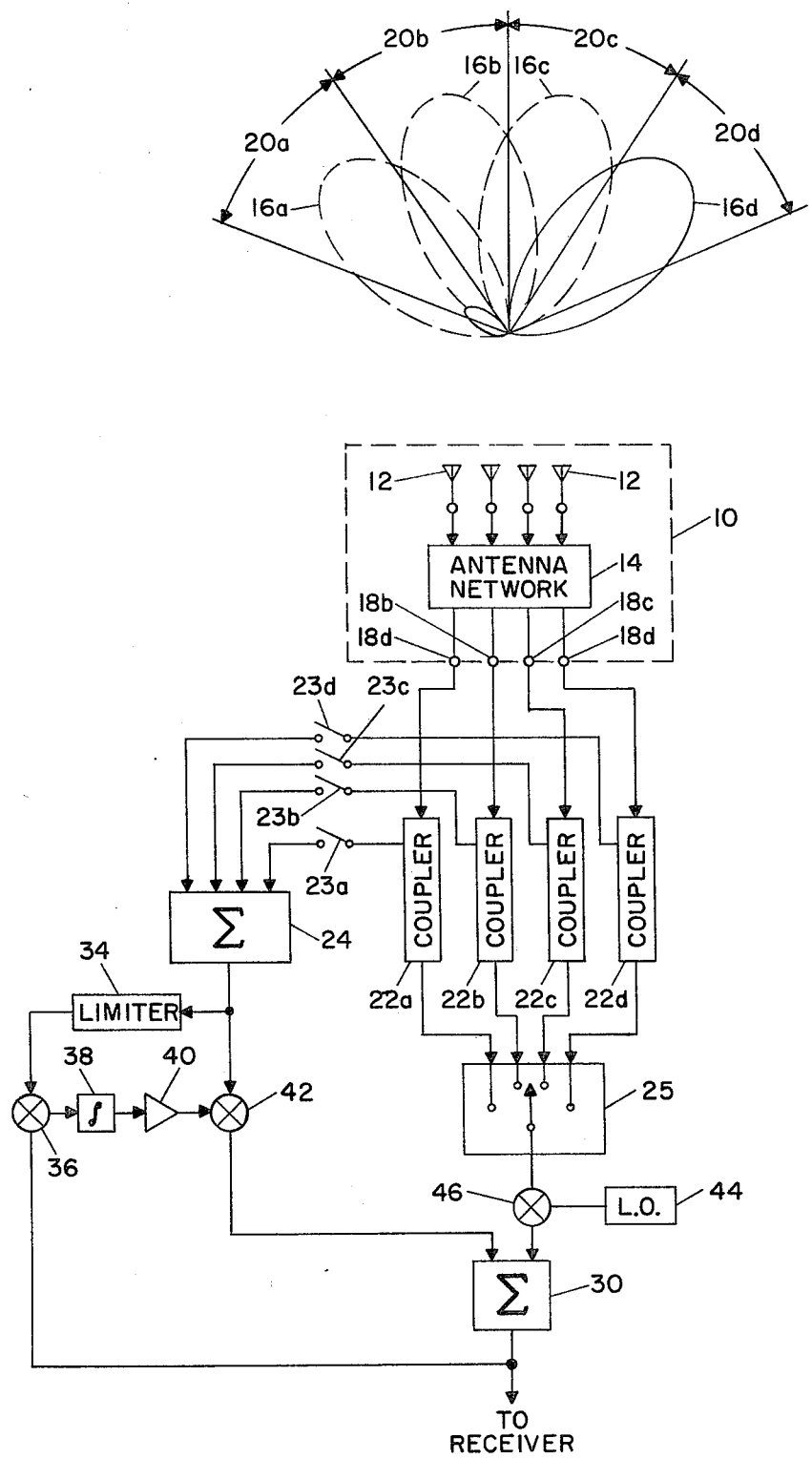
FIG. 1 is a schematic diagram of a system constructed in accordance with the present invention.

Description and Operation of the FIG. 1 System

FIG. 1 shows a system constructed in accordance with the present invention. Shown in FIG. 1 is antenna unit 10 which includes a plurality of antenna elements 12 and an antenna beam forming network 14 connected to the antenna unit 12. Beam forming network 14 may be a well-known Butler Matrix or any other type suitable for providing antenna element phasing. Antenna unit 10 is capable of generating antenna beams 16a, 16b, 16c and 16d in response to wave energy signals supplied to the ports 18a, 18b, 18c and 18d of antenna network 14. Because of the reciprocal nature of antenna unit 10, signals originating in angular region 20a will be primarily received by antenna beam 16a and primarily supplied to antenna port 18a. Likewise, signals from angular regions of space 20b, 20c and 20d will be primarily supplied to corresponding antenna ports 18b, 18c and 18d, respectively.

Each of the antenna ports 18 is therefore primarily responsive to signals received from a corresponding region of space, but those skilled in the art will also recognize that signals from directions outside of the corresponding angular region of space will also appear in each of the antenna ports because of the imperfections of antenna beam shaping, principally beam fall off and antenna sidelobes. In FIG. 1 antenna beam 16d is shown, for example, to include a main beam primarily responsive to signals originating in angular region of space 20d, and also a sidelobe which is responsive to a lesser degree to signals originating in region of space 20a. Hence antenna port 18d is primarily responsive to signals originating in angular region 20d, and also responsive, to a lesser extent, to signals originating in angular region 20a. It may also be seen that antenna port 18d will be responsive to signals originating in portions of spacial region 20c because of the antenna beam fall off in this angular region.

In the FIG. 1 antenna system there is further provided directional couplers 22a, 22b, 22c and 22d each connected to a corresponding output port 18. The output port of each of the couplers 22 is connected to a corresponding one of the poles of single pole multi-throw switch 25. The coupled ports of couplers 22 are connected to combining unit 24 by single pole switches 23a, 23b, 23c, and 23d. Multi-throw switch 25 may be used to connect any of the output ports 18 to a receiver by means of combiner 30. There is included between switch 25 and combiner 30 in the embodiment of FIG. 1 a local oscillator 44 and mixer 46 to affect an IF conversion of the signal from the selected antenna port 18.

Combiner 24 forms a reference signal in response to the signals supplied from the coupled ports of directional couplers 22. In some cases it may be desirable to exclude from the reference signal generated in combiner 24 the coupled output of the antenna port 18 corresponding to the direction of the desired signal. To achieve this the appropriate switch 23 may be opened while the remaining switches 23 are in the closed position. It is entirely possible, however, to practice the present invention without having any of the switches 23 opened and therefore have the reference signal generated in combiner 24 representative of the combination of the signals in all of the antenna ports 18.

The output of combiner 24 is supplied to mixer 42, and also to mixer 36 by limiter 34. Also supplied to mixer 36 is a portion of the output signal from combiner 30. The combination of the reference signal from combiner 24 and the output signal from combiner 30 in mixer 36 causes the generation of a control signal which is supplied to mixer 42 by integrator 38 and amplifier 40. Since the output of combiner 30 has undergone a frequency conversion in mixer 46, the control signal will have the same frequency as local oscillator 44.

The operation of the FIG. 1 antenna system is very similar to that described in the above-referenced co-pending application. If it is desired to receive a signal which originates in region 20a, switch 25 is appropriately set to couple the output of antenna port 18a to combiner 30 by means of mixer 46. In this case switch 23a may be opened while switches 23b, 23c, and 23d are in the closed position. Combiner 24 is therefore supplied with a portion of the output signal of antenna ports 18b, 18c and 18d which are combined to form a reference signal. The relative amplitude of the coupling from antenna ports 18b, 18c and 18d to combiner 24 is considerably lower than the coupling from antenna port 18a to combiner 30 by reason of the coupling ratio selected for directional couplers 22. Typically the coupling ratio selected for directional couplers 22 would be approximately equal to the sidelobe level expected from antenna beams 16.

When there is only a desired signal incident from region of space 20a, that signal is supplied from antenna port 18a to combiner 30 by switch 25. If switch 23a is in the open position, only signals from antenna ports 18b, 18c and 18d are supplied to combiner 24 to form the reference signal. Since the desired signal from region 20a is primarily supplied to antenna port 18a, only a small amount of the incident desired signal, corresponding to the antenna beam fall-off or sidelobe level will be supplied to the remaining antenna ports 18b, 18c and 18d. The magnitude of the signals at these antenna ports if further reduced by the coupling ratio of couplers 22b, 22c and 22d prior to supplying the signals to combiner 24 to form the reference signal. The reference signal supplied to mixers 36 and 42 will therefore be representative of the desired signal, but at a considerably lower signal level than the desired signal supplied directly to combiner 30. A control signal will be developed at mixer 36 having a correspondingly low signal level and only a small correction signal will be generated in mixer 42 because of the low signal level of both the reference signal and the control signal.

The system will also operate in a similar manner if switch 23a is closed, thereby allowing the desired signal from antenna port 18a to be supplied to combiner 24 at a signal level which is reduced by only the coupling ratio of coupler 22a. This condition corresponds to there being no switches 23 present in the system. In this case the reference signal and control signals will have greater amplitude than in the case where switch 23a is opened, but because the signals have been reduced by the coupling ratio of coupler 22a, the correction signal generated will have insufficient amplitude to cancel the desired signal supplied to combiner 30 by switch 25.

When in addition to the desired signal from region 20a, there is incident on the antenna system an interfering signal from another region of space 20b, 20c or 20d, the interfering signal as well as the desired signal will appear at antenna port 18a. The interfering signal may reach port 18a by reason of a sidelobe of antenna beam 16a or by reason of the antenna beam fall-off in region 20b. In this case, although antenna port 18a is primarily responsive to signals originating in region of space 20a, the interfering signal may have such greater signal level incident on the antenna system that it appears at antenna port 18a with greater magnitude than the desired signal. The interfering signal and desired signal are both supplied to combiner 30 by switch 25.

When the interfering signal is incident from a region of space corresponding to another antenna port, for example region 20b, corresponding to antenna port 18b, the interfering signal is supplied to port 18b with greater amplitude than the interfering signal supplied to port 18a. In that case it is also supplied by coupler 22b to combiner 24 and appears in the reference signal formed in combiner 24. The coupling ratio of coupler 22b is selected so that the reference signal formed by combiner 24 has approximately the same amplitude of interfering signal as is supplied to mixer 46 by switch 25. Thus if the response of antenna port 18a to signals incident from regions 20b, 20c and 20d is 10 dB below the response of ports 18b, 18c and 18d to those signals as combined in combiner 24, a 10 dB coupling ratio would be appropriate.

The reference signal formed in combiner 24, which is primarily representative of the interfering signal is supplied to mixer 36 by limiter 34. Limiter 34 is used to achieve greater system dynamic range as is fully explained in the co-pending application of R. J. Masak, Ser. No. 489,623, filed July 18, 1974, entitled "Spectrum Notcher", which is assigned to the same assignee as the present application. Also supplied to mixer 36 is a portion of the output signal from combiner 30, which includes both the desired signal and the interfering signal following frequency conversion in mixer 46. Since the reference signal supplied to mixer 36 is primarily representative of the interfering signal, there will be developed a control signal representative of the amplitude and phase of the interfering signal present in the output signal supplied to mixer 36. The control signal is supplied to mixer 42 by integrator 38 and amplifier 40. Integrator 38 is typically a very narrow band filter which determines the response time of the circuitry as is fully explained in the above referenced co-pending application entitled Spectrum Notcher. The control signal supplied to mixer 42 has the same frequency as local oscillator 44 since that is the amount that the output signal supplied to mixer 36 has been shifted in frequency with respect to the reference signal. At mixer 42 the control signal causes a frequency conversion and modulation of the reference signal to develop a correction signal suitable for causing cancellation of the interfering signal at combiner 30. Those skilled in the art will recognize that appropriate adjustment of the phase of either the reference signal or the output signal supplied to mixer 36 may be required to assure that the correction signal has a phase appropriate to cancel the interfering signal in output combiner 30.

While it is convenient to implement the invention utilizing IF conversions as has been described, those skilled in the art will recognize that such conversions are not necessary. R. J. Masak's above-referenced co-pending application entitled Spectrum Notcher has described such alternate methods for developing similar correction signals without IF conversions.

Figure 2:
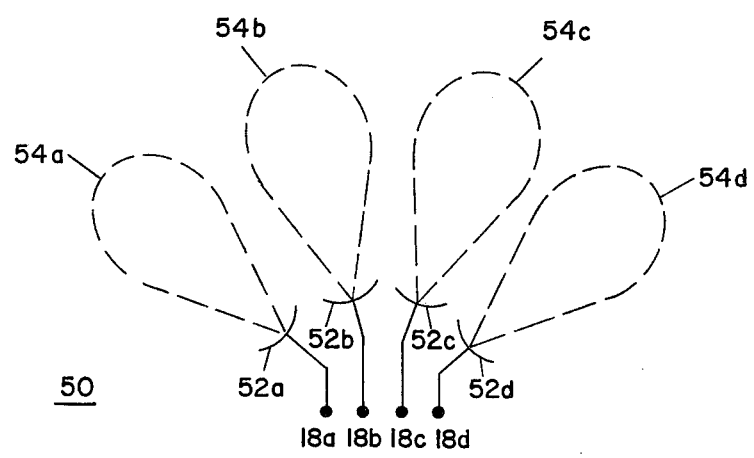
FIG. 2 shows an alternate antenna unit for use in the antenna system of FIG. 1.

It will also be recognized by those skilled in the art that other types of antenna units, other than the one illustrated in FIG. 1, may be used in practicing the invention. FIG. 2 illustrates an antenna unit 50 comprising individual radiating means 52a, 52b, 52c and 52d, each connected to a corresponding antenna port 18. Each of the radiating means 52 is capable of radiating a directional antenna beam 54, and consequently of receiving signals primarily from a corresponding region of space.

While there have been described what are believed to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A system for receiving desired wave energy signals from a selected angular region of space within the area covered by the system and for suppressing interfering signals from all other angular regions within the coverage area comprising:
   antenna means, having a first plurality of antenna elements and a second plurality of output ports, for receiving wave energy signals from said coverage area and for developing at each of said output ports a signal primarily representative of the wave energy signals received from a corresponding predetermined angular region of said coverage area;
   first means for combining supplied signals in accordance with a predetermined function to develop an output signal;
   second means for combining supplied signals in accordance with a predetermined function to develop a reference signal;
   means for coupling signals, including desired and interfering signal components, from a selected output port of said antenna means to an input of said first combining means and for coupling a portion of the signals from at least the remainder of said antenna ports to inputs of said second combining means;
   means for developing a correction signal comprising:
      means for mixing the output signal from said first combining means and the reference signal from said second combining means thereby to develop a control signal;
      means for mixing said control signal and said reference signal thereby to develop a correction signal;
   and means for coupling said correction signal to an input of said first combining means thereby causing suppression of said interfering signal components in said output signal.

2. A system as specified in claim 1 wherein said coupling means couples a portion of the signals from all of said antenna ports to inputs at said second combining means.

3. A system as specified in claim 1 wherein said antenna means comprises an array of antenna elements and an antenna beam-forming network.

4. A system as specified in claim 1 wherein said antenna means comprises a plurality of directional radiating antennas each having an output port and each oriented to receive signals primarily from a different angular region of space within the coverage area.

5. A system as specified in claim 1 wherein each of said combining means is an adder.

* * * * *